United States Patent
Fukaya et al.

(10) Patent No.: US 7,805,285 B2
(45) Date of Patent: Sep. 28, 2010

(54) MACHINING SIMULATION SYSTEM

(75) Inventors: Yasushi Fukaya, Aichi (JP); Katsunori Kunimitsu, Aichi (JP)

(73) Assignee: Okuma Corporation, Aichi (JP)

(*) Notice: Subject to any disclaimer, the term of this patent is extended or adjusted under 35 U.S.C. 154(b) by 417 days.

(21) Appl. No.: 11/872,788

(22) Filed: Oct. 16, 2007

(65) Prior Publication Data

US 2008/0103741 A1 May 1, 2008

(30) Foreign Application Priority Data

Oct. 30, 2006 (JP) ............................. 2006-293961

(51) Int. Cl.
- G06F 17/50 (2006.01)
- G05B 19/406 (2006.01)
- G05B 19/4093 (2006.01)

(52) U.S. Cl. ................................ 703/2; 703/7; 700/179

(58) Field of Classification Search ..................... 703/2, 703/7; 700/183, 184, 173, 179
See application file for complete search history.

(56) References Cited

U.S. PATENT DOCUMENTS 5,815,400 A * 9/1998 Hirai et al. .................. 700/173
6,505,092 B1 * 1/2003 Fukaya et al. ............... 700/184
2004/0128016 A1 * 7/2004 Stewart ....................... 700/159

FOREIGN PATENT DOCUMENTS

JP        5042446        2/1993

* cited by examiner

*Primary Examiner*—Thai Phan
(74) *Attorney, Agent, or Firm*—Gauthier & Connors LLP (57) ABSTRACT

A numerical control apparatus can perform a machining simulation or an interference check that reflects worksite information. However, a machining simulation apparatus cannot use worksite information in a machining simulation or an interference check. Thus, simulation conditions of the machining simulation apparatus are different from those of the numerical control apparatus. To solve this problem, a machining simulation apparatus and a numerical control apparatus according to the present invention can communicate with each other via a communication unit or a storage medium so as to mutually transmit and receive data. The machining simulation apparatus includes a network transmission/reception control unit or an external memory reading/writing unit. Similarly, the numerical control apparatus includes a network transmission/reception control unit or an external memory reading/writing unit.

4 Claims, 12 Drawing Sheets

\*\*\* TOOL SETUP INFORMATION ( PREPARATORY PLANNING INFORMATION ) \*\*\*

| TOOL NUMBER | TOOL REST SETUP NUMBER | STICKING OUT DIRECTION | SETUP DIRECTION | CUTTING EDGE DISTANCE (Z) | CUTTING EDGE DISTANCE (X) |
|---|---|---|---|---|---|
| 1 | 1 | X− | POSITIVE | 80.000 | 170.000 |
| 2 | 2 | X− | POSITIVE | 50.000 | 90.000 |
| 3 | 3 | X− | POSITIVE | 50.000 | 130.000 |
| 5 | 4 | Z− | POSITIVE | 200.000 | 30.000 |
| 6 | 6 | X− | POSITIVE | 85.000 | 135.000 |
| 8 | 8 | Z− | POSITIVE | 188.000 | 40.000 |
| 10 | 9 | X− | POSITIVE | 75.000 | 190.000 |
| 14 | 12 | X− | POSITIVE | 60.000 | 55.000 |

* TOOL SHAPE SETTING/DISPLAY *

| TOOL NUMBER | 8 |
|---|---|

| TOOL TYPE | OUTER DIAMETER SINGLE-EDGED |
|---|---|
| DIRECTION : HAND OF CUT | RIGHTHAND |
| CUTTING EDGE ANGLE 1(A1) | 55.000 |
| CUTTING EDGE ANGLE 2(A2) | 3.000 |
| TOOL LENGTH (L1) | 100.000 |
| TOOL WIDTH 1(D1) | 25.000 |
| TOOL WIDTH 2(D2) | 32.000 |
| CUTTING EDGE "R" | 0.800 |
| TOOL HEIGHT | 25.000 |
| TIP HEIGHT | 50.000 |

TOOL SHAPE GUIDANCE VIEW

Fig. 10

* TOOL SETUP POSITION SETTING/DISPLAY *

| TOOL NUMBER | 8 |
|---|---|
| TOOL REST SETUP NUMBER | 5 |
| STICKING OUT DIRECTION | X– |
| SETUP DIRECTION | POSITIVE |
| CUTTING EDGE DISTANCE (Z) | 30.000 |
| CUTTING EDGE DISTANCE (X) | 80.000 |

TOOL SETUP POSITION GUIDANCE VIEW

MACHINING SIMULATION SYSTEM

CROSS-REFERENCE TO RELATED APPLICATIONS

This application claims priority to Japanese Patent Application No. 2006-293961 filed on Oct. 30, 2006, which is incorporated herein by reference in its entirety.

BACKGROUND OF THE INVENTION

1. Field of the Invention

The present invention relates to a machining simulation system including a numerical control apparatus configured to control a machining motion of a machine tool and a machining simulation apparatus configured to perform a simulation prior to an actual machining operation.

2. Description of the Related Art

A numerical control apparatus can control a machine tool according to numerical control information input by an operator of a production engineering division who can use a machining simulation apparatus. The machining simulation apparatus has a machining simulation function (including an interference check function) for checking an motion of a machine tool to be realized according to a machining command involved in the numerical control information. The machining simulation apparatus is, for example, constituted by a personal computer that can realize highly advanced performances according to software programs.

On the other hand, a numerical control apparatus of a worksite enables an operator to use a machining simulation function. For example, the machining simulation function provided by a numerical control apparatus includes checking beforehand an motion of a machine tool (including an interference check) to be used in a machining operation. Furthermore, the machining simulation function provided by the numerical control apparatus may include graphically displaying the progress of an actual machining operation if an operator cannot visually check the operation inside a machine tool after a door of the machine tool is closed.

After numerical control information has been determined by an operator of a production engineering division using the machining simulation apparatus, an operator of a worksite may modify the numerical control information according to machining processing environments. As a result, setup positions of a tool and a material according to the corrected numerical control information may differ from those determined by the operator of the production engineering division.

For example, a worksite environment may prevent preparation of a tool designated by an operator of the production engineering division, or may make it impossible to install the tool at a designated position. Accordingly, before performing actual machining work, an operator of the worksite uses the machining simulation function of the numerical control apparatus that can check an motion of the machine tool to be performed according to the numerical control information corrected according to the machining processing environment of the worksite.

Figure 6:
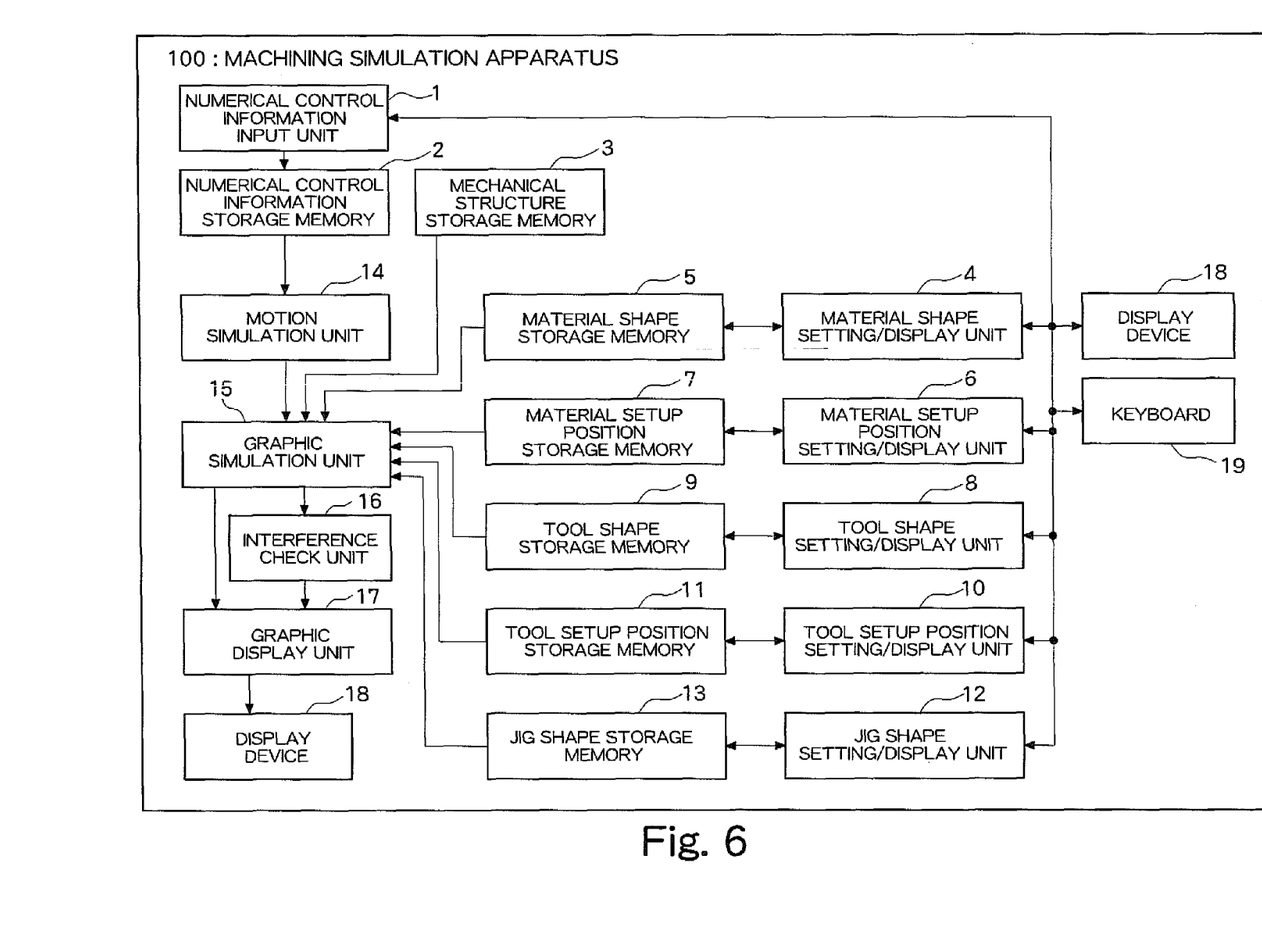
FIG. 6 is a block diagram illustrating a conventional machining simulation apparatus.
Figure 7:
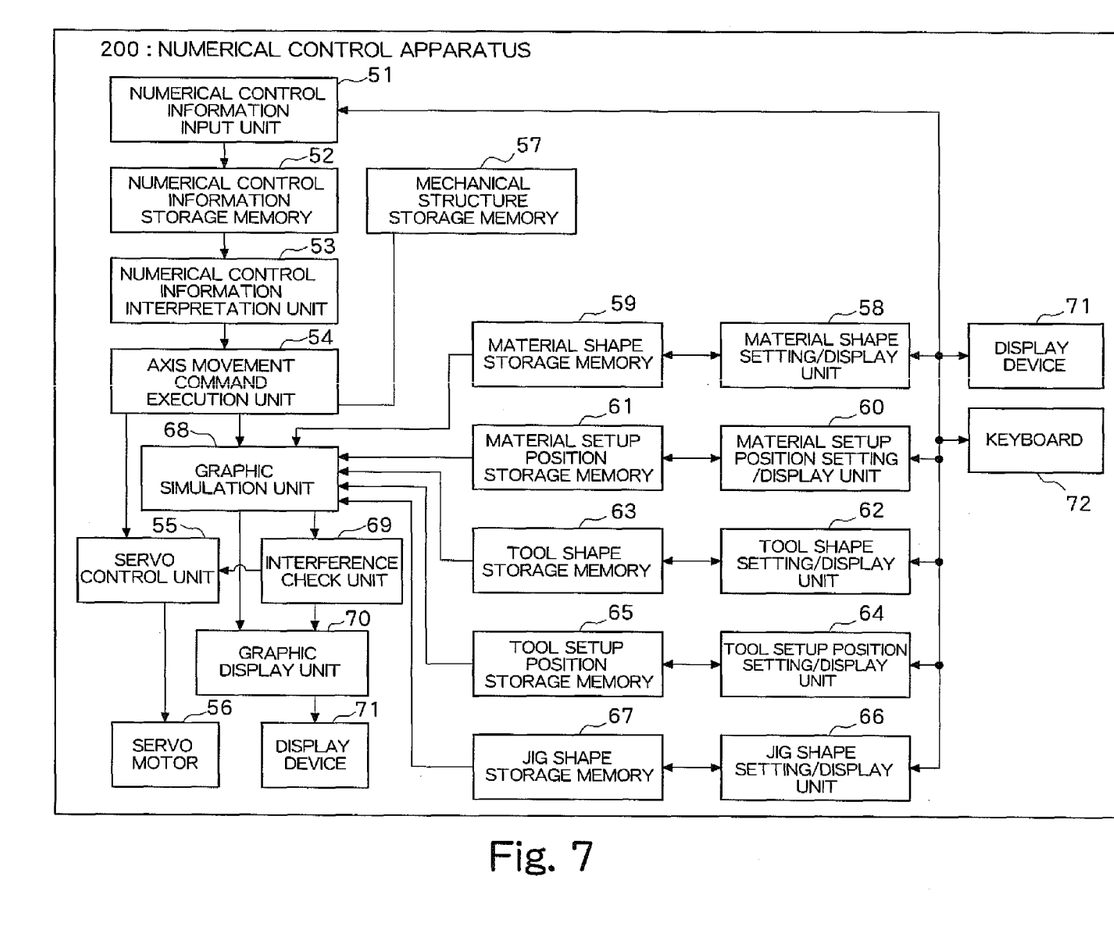
FIG. 7 is a block diagram illustrating a conventional numerical control apparatus.

FIG. 6 illustrates a conventional machining simulation apparatus 100 that can be used in a production engineering division. FIG. 7 illustrates a conventional numerical control apparatus provided on a worksite that can control a machine tool.

A numerical control information input unit 1 enables an operator to input numerical control information (e.g., machining simulation data and interference check data) via a keyboard 19. A numerical control information storage memory 2 stores the input numerical control information. A mechanical structure storage memory 3 stores various shape models including a tool rest, a main spindle, and a table of a machine tool, which are used for a machining simulation or an interference check.

Figure 8:
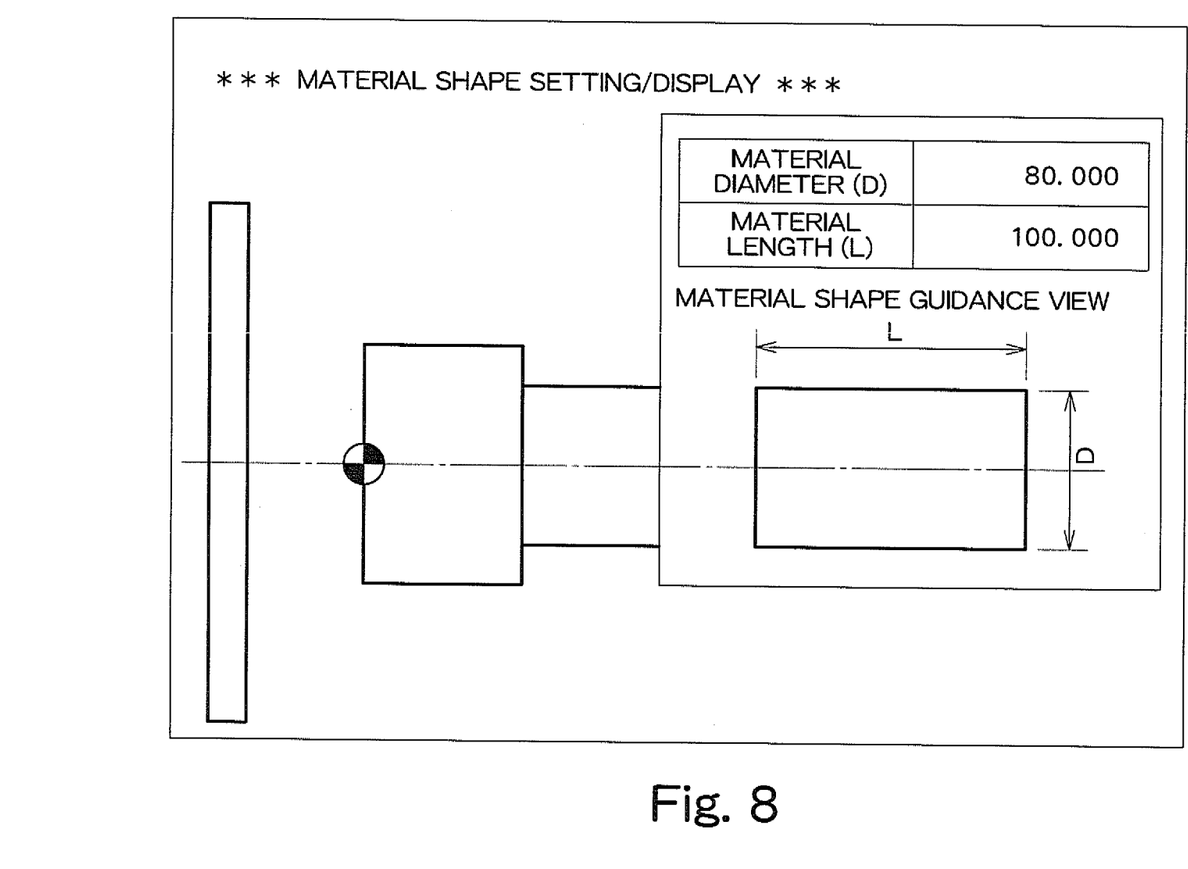
FIG. 8 illustrates a material shape setting/display screen according to an embodiment of the present invention.

A material shape setting/display unit 4 enables an operator to input a material shape model used in a machining simulation via the keyboard 19. A material shape storage memory 5 stores the input material shape model. The material shape setting/display unit 4 causes the display device 18 to display an operation screen that instructs an operator to input a material shape model and enables the user to confirm the input material shape model. FIG. 8 illustrates an exemplary operation screen displayed by the display device 18 according to the processing performed by the material shape setting/display unit 4.

Figure 9:
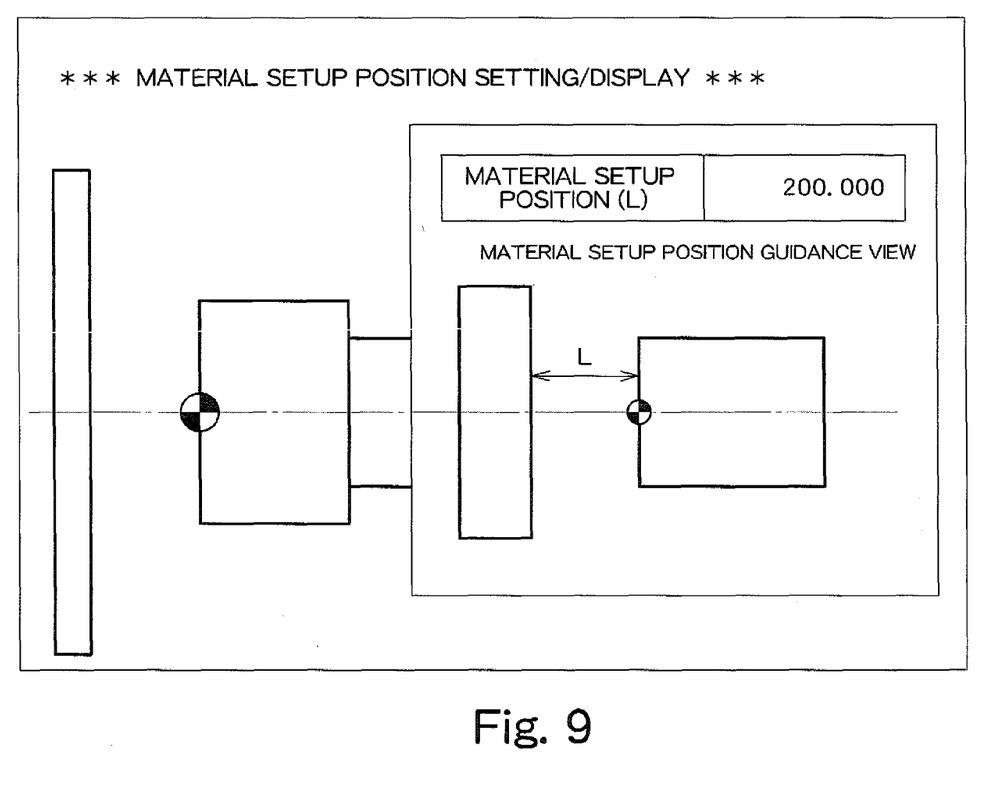
FIG. 9 illustrates a material setup position setting/display screen according to an embodiment of the present invention.

A material setup position setting/display unit 6 enables an operator to input a material setup position via the keyboard 19. The material setup position indicates a position where the input material shape model is placed on a machine tool to be subjected to the machining simulation. A material setup position storage memory 7 stores the input material setup position. The material setup position setting/display unit 6 causes the display device 18 to display an operation screen that instructs an operator to input a material setup position and enables the user to confirm the input material setup position. FIG. 9 illustrates an exemplary operation screen displayed by the display device 18 according to the processing performed by the material setup position setting/display unit 6.

If a lathe grips and holds a material with a chuck attached to a main spindle, a relative distance between a reference point on a right-edge surface of the main spindle and a reference point of a material model can define the material setup position. If a machining center fixes and holds a material with a jig on a table, a relative distance between a predetermined reference point of the table and a reference point of a material model can define the material setup position.

Figure 10:
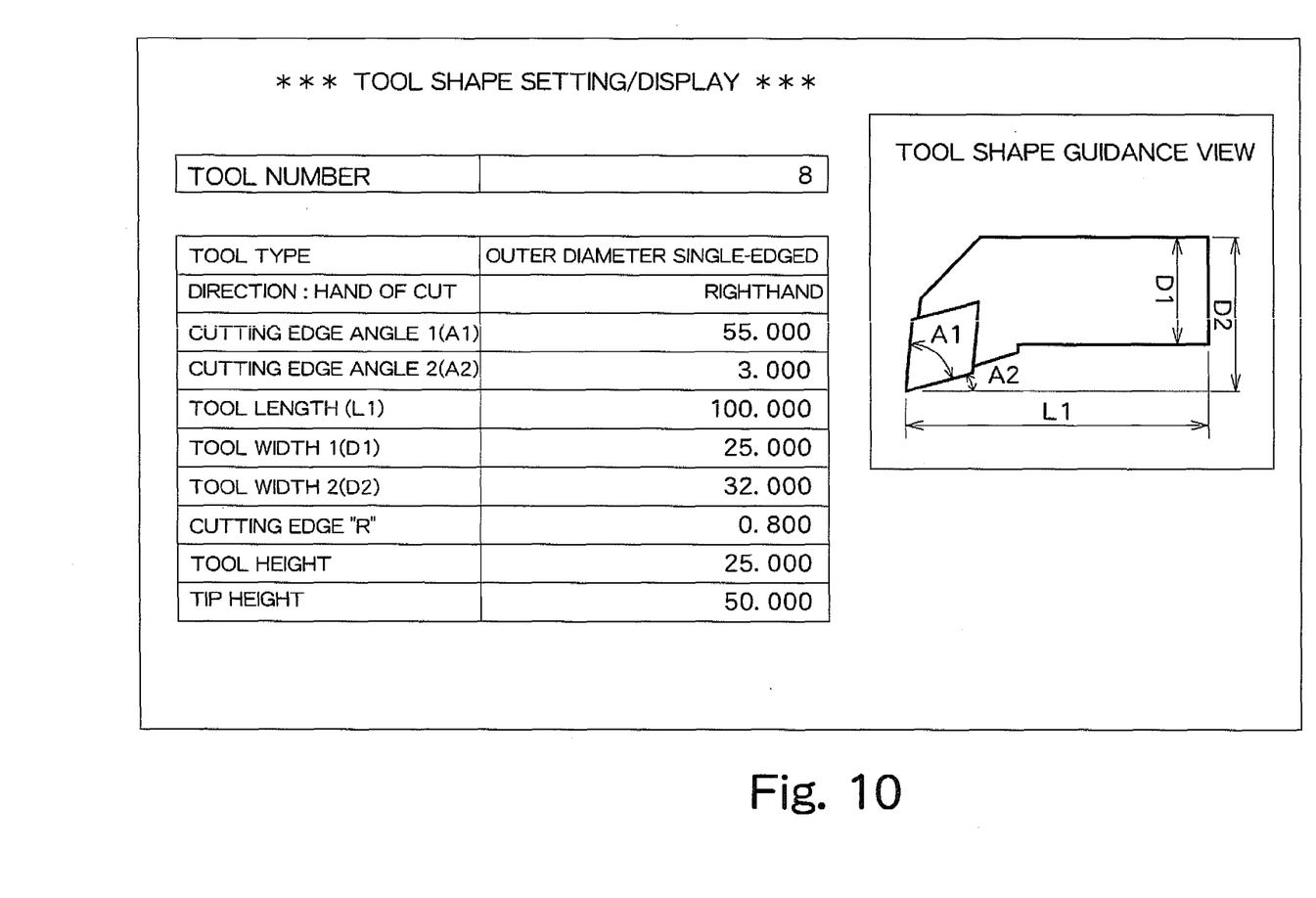
FIG. 10 illustrates a tool shape setting/display screen according to an embodiment of the present invention.

A tool shape setting/display unit 8 enables an operator to input a tool shape model used in a machining simulation via the keyboard 19. A shape storage memory 9 stores the input tool shape model. The tool shape setting/display unit 8 causes the display device 18 to display an operation screen that instructs an operator to input a tool shape model and enables the user to confirm the input tool shape model. FIG. 10 illustrates an exemplary operation screen displayed by the display device 18 according to the processing performed by the tool shape setting/display unit 8.

Figure 11:
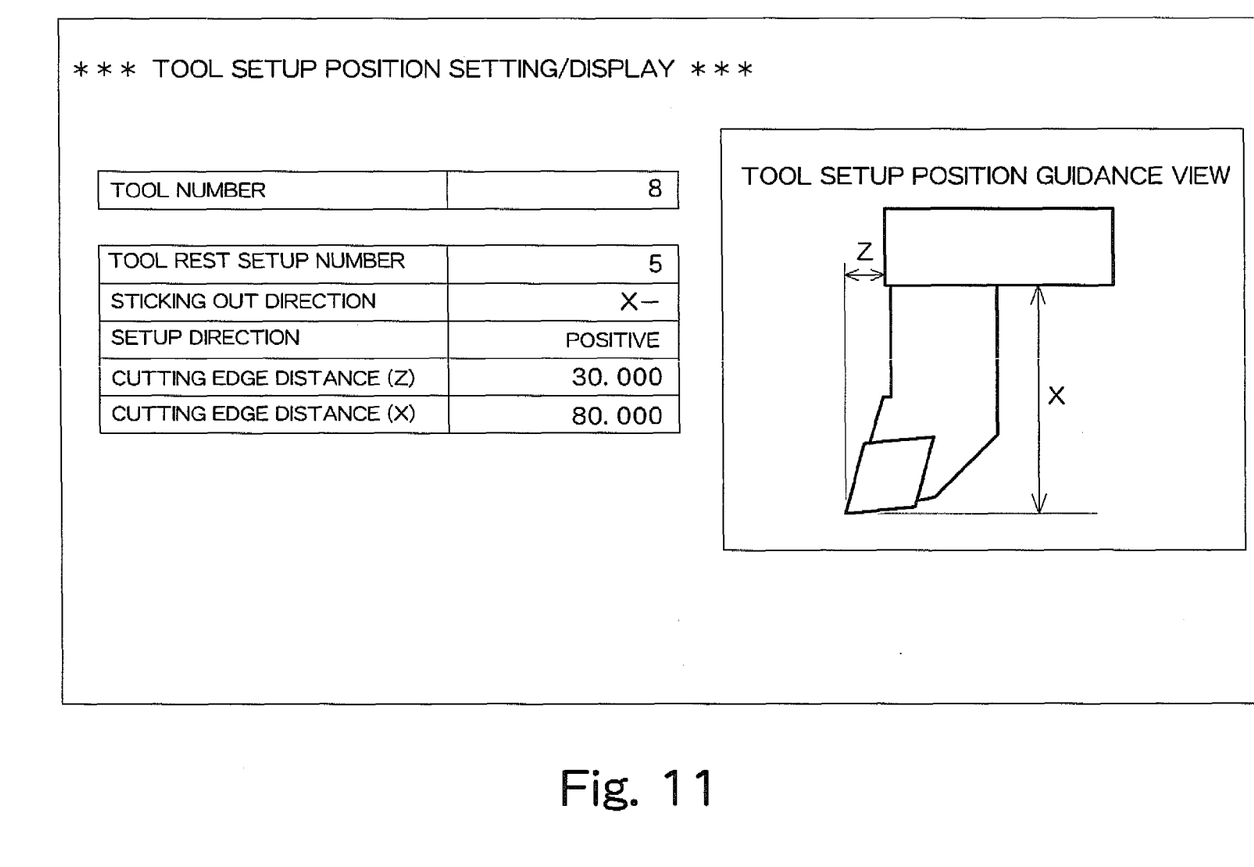
FIG. 11 illustrates a tool setup position setting/display screen according to an embodiment of the present invention.

Furthermore, a tool setup position setting/display unit 10 enables an operator to input a tool setup position via the keyboard 19. The tool setup position indicates a position at which the input tool shape model is placed on a machine tool to be subjected to the machining simulation. A tool setup position storage memory 11 stores the input tool setup position. The tool setup position setting/display unit 10 causes the display device 18 to display an operation screen that instructs an operator to input a tool setup position and enables the user to confirm the input tool setup position. FIG. 11 illustrates an exemplary operation screen displayed by the display device 18 according to the processing performed by the tool setup position setting/display unit 10.

If a lathe allows the attachment of a plurality of tools on a tool rest, the tool setup position may indicate the position of each tool on the tool rest or indicate a dimension relating to the installation, such as a relative distance between a reference point of the tool rest and a cutting edge point of a tool shape model. If a machining center has a main spindle to which a tool can be attached, the tool setup position may indicate a relative distance between a reference point on an edge surface of the main spindle and a cutting edge point of a tool shape model.

Figure 12:
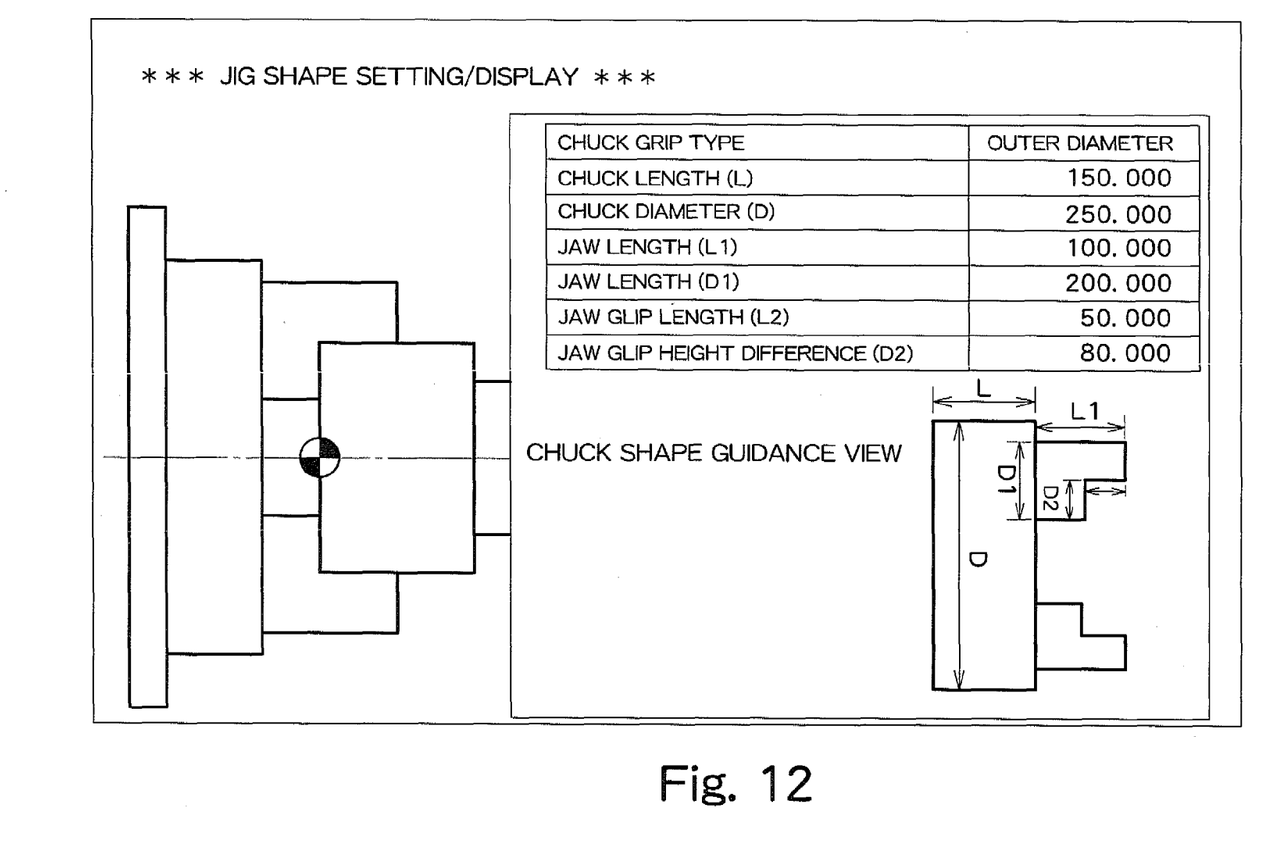
FIG. 12 illustrates a jig shape setting/display screen according to an embodiment of the present invention.

Similarly, a jig shape setting/display unit 12 enables an operator to input a jig shape model used in a machining simulation via the keyboard 19. A jig shape storage memory 13 stores the input jig shape model. The jig shape setting/display unit 12 causes the display device 18 to display an operation screen that instructs an operator to input a jig shape model and enables the user to confirm the input jig shape model. FIG. 12 illustrates an exemplary operation screen displayed by the display device 18 according to the processing performed by the jig shape setting/display unit 12.

If this system is applied to a lathe capable of gripping and holding a material with a chuck attached to a main spindle, the setup position of a chuck (i.e., jig) can be accurately determined. In such a case, the system may not include a unit configured to perform setting/display processing for a jig and a storage memory that can store setting data.

As described above, machining simulation data and interference check data (i.e., material shape model, tool shape model, setup position, and jig shape model) are stored in respective storage memories.

An motion simulation unit 14 reads the numerical control information from the numerical control information storage memory 2 and performs an motion simulation. The motion simulation includes reading a command relating to a machining operation involved in the numerical control information and generating a pseudo operation signal corresponding to a axis moving signal of a tool rest, a main spindle, or a table.

A graphic simulation unit 15 reads the material shape model from the material shape storage memory 5 and locates the retrieved material shape model on a desired position of the machine tool subjected to a graphic simulation according to the material setup position read from the material setup position storage memory 7. Then, the graphic simulation unit 15 reads the tool shape model from the tool shape storage memory 9 and locates the retrieved tool shape model on a desired position of the machine tool subjected to a graphic simulation according to the tool setup position read from the tool setup position storage memory 11.

Furthermore, the graphic simulation unit 15 reads the jig shape model from the jig storage memory 13 and locates the readout jig shape model on a predetermined position of the machine tool subjected to graphic simulation. Furthermore, the graphic simulation unit 15 performs a pseudo sequential motion of a tool rest, a main spindle, and a table that hold the tool shape model and the material shape model according to a pseudo operation signal received from the motion simulation unit 14. The display device 18 displays a state of this graphic simulation on its screen according to the processing of the graphic display unit 17.

An interference check unit 16 performs an interference check for determining whether the shift movement of a tool rest, a main spindle, or a table (i.e., simulation result by the graphic simulation unit 15) might interfere with a material, a tool, or a jig. Then, if the interference check unit 16 determines that any interference is possible, the display device 18 presents a graphic display (e.g., warning message) indicating the interference to an operator.

FIG. 7 illustrates an exemplary configuration of a numerical control apparatus 200. A numerical control information input unit 51 enables an operator to input numerical control information via a keyboard 72. A numerical control information storage memory 52 stores the input numerical control information.

The numerical control apparatus 200 comprises various units similar to the above-described units of the machining simulation apparatus 100. More specifically, a mechanical structure storage memory 57 is functionally similar to the mechanical structure storage memory 3. A material shape setting/display unit 58 is functionally similar to the material shape setting/display unit 4. A material shape storage memory 59 is functionally similar to the material shape storage memory 5. A material setup position setting/display unit 60 is functionally similar to the material setup position setting/display unit 6. A material setup position storage memory 61 is functionally similar to the material setup position storage memory 7. A tool shape setting/display unit 62 is functionally similar to the tool shape setting/display unit 8. A tool shape storage memory 63 is functionally similar to the tool shape storage memory 9. A tool setup position setting/display unit 64 is functionally similar to the tool setup position setting/display unit 10. A tool setup position storage memory 65 is functionally similar to the tool setup position storage memory 11. A jig shape setting/display unit 66 is functionally similar to the jig shape setting/display unit 12. A jig shape storage memory 67 is functionally similar to the jig shape storage memory 13.

In the example described, the system employs similar arrangements for setting/displaying/storing the material/tool shape models, the material/tool setup positions, and the jig shape model in order to simplify the description. In this respect, a numerical control apparatus and a machining simulation apparatus of a machining simulation system according to the present invention are not limited to similar existing units.

As described above, machining simulation data and interference check data (i.e., material shape model, tool shape model, setup position, and jig shape model) are stored in respective storage memories.

A numerical control information interpretation unit 53 reads the numerical control information from the numerical control information storage memory 52 and interprets the retrieved information. The numerical control information interpretation unit 53 transmits a axis movement command involved in the interpreted numerical control information to a axis movement command execution unit 54. Furthermore, the numerical control information interpretation unit 53 transmits other commands (e.g., a main spindle rotation command and a cutting fluid discharge command) to related execution units (not illustrated).

The axis movement command execution unit 54 generates a axis moving signal according to the axis movement command. In an actual work control, the axis movement command execution unit 54 transmits the generated axis moving signal to a servo control unit 55. The servo control unit 55 controls a servo motor 56 according to the axis moving signal. The servo motor 56 performs a axis moving operation for a tool rest, a main spindle, or a table of the machine tool.

If the numerical control apparatus 200 performs a machining simulation or an interference check concurrently with an actual work control, the axis movement command execution unit 54 transmits a axis moving signal to a graphic simulation unit 68. The graphic simulation unit 68 executes processing similar to that of the above-described graphic simulation unit 15 of the machining simulation apparatus 100. An interference check unit 69, a graphic display unit 70, and a display device 71 are functionally similar to those of the interference check unit 16, the graphic display unit 17, and the display device 18 of the machining simulation apparatus 100.

The interference check unit 69, if any interference is detected, transmits a stop signal to the servo control unit 55.

The servo control unit 55 stops the axis movement of the tool rest, the main spindle, or the table.

If the numerical control apparatus 200 performs only a machining simulation or an interference check without performing an actual work control, the axis movement command execution unit 54 transmits a axis moving signal only to the graphic simulation unit 68 (i.e., does not transmit a axis moving signal to the servo control unit 55). Therefore, the servo motor 56 does not perform a axis moving operation for an actual work.

As described above, according to a conventional system, the machining simulation apparatus 100 provided in a production engineering division performs a machining simulation including an interference check prior to an actual machining operation. On the other hand, the numerical control apparatus 200 provided on a worksite performs a machining simulation including an interference check based on numerical control information reflecting actual machining conditions and corrections made by an operator of a worksite.

In other words, the production engineering division and the worksite independently perform the machining simulations based on different conditions. Therefore, the machining simulation apparatus provided in the production engineering division and the numerical control apparatus provided on the worksite are unable to mutually readjust the differences in the machining simulation conditions.

If the numerical control apparatus provided on the worksite repeatedly performs a machining simulation reflecting the specificity of the worksite (e.g., corrections according to machining conditions), simulation contents of the machining simulation apparatus provided in the production engineering division gradually separate from simulation contents of the numerical control apparatus provided on the worksite. The above-described conventional system cannot readjust the separated simulation contents and simulation conditions.

According to the description of the system disclosed in Japanese Patent Laid-open Application No. 5-42446, an apparatus performing an interference check can cooperate with a numerical control apparatus. More specifically, the numerical control apparatus actually moves a movable member and detects a position where the movable member interferes with a workpiece. The numerical control apparatus transfers the obtained positional information to a CAD/CAM apparatus having an interference check function.

However, in the above-described conventional system, the numerical control apparatus performs only a machining processing control and is simply combined with the CAD/CAM apparatus having a simulation function. In other words, the above-described conventional system cannot perform an adjustment between the machining simulation apparatus performing a simulation prior to an actual machining operation and the numerical control apparatus performing a simulation reflecting worksite information.

As described above, each of the machining simulation apparatus and the numerical control apparatus performs a machining simulation or an interference check. In this case, as apparent from the foregoing description, an operator of the machining simulation apparatus and an operator of the numerical control apparatus are required to independently set a material shape model, a material setup position, a tool shape model, and a tool setup position.

Accordingly, the following problems arise:

*1: Even after a material shape model, a material setup position, a tool shape model, and a tool setup position have been set for the machining simulation apparatus, similar data setting is required for the numerical control apparatus.

*2: An operator of the worksite is required to input all of the data required for the numerical control apparatus, thereby increasing the likelihood of data entry or setting errors.

*3: An operator of the machining simulation apparatus side is required to generate a paper document or other medium that describes or indicates preparatory planning information including setting data contents, such as a material shape model, set by a machining simulation apparatus and send it to the operator of the numerical control apparatus side.

*4: Any data corrected by the numerical control apparatus side according to a machining processing environment cannot be easily transmitted to the machining simulation apparatus side. Such corrected data cannot be transmitted unless a paper document or other medium is used.

*5: The machining simulation apparatus side cannot collect the data actually used in a machining operation and cannot establish a reusable database including such correction data. As a result, an environment of the machining simulation apparatus cannot be improved so as to fit to the environment of the worksite.

SUMMARY OF THE INVENTION

To solve the above-described problems, the present invention provides a machining simulation system including a numerical control apparatus capable of performing a machining simulation with a tool shape model and a material shape model and a machining simulation apparatus capable of performing a machining simulation with the tool shape model and the material shape model. The machining simulation apparatus can communicate with the numerical control apparatus via a communication unit or a storage medium so as to mutually transmit and receive data. The machining simulation apparatus includes a shape model output unit configured to output the tool shape model and the material shape model that can be used in the numerical control apparatus, and a setup position output unit configured to output a tool setup position and a material setup position on a machine tool. The numerical control apparatus includes a shape model reading unit configured to read the shape model output from the shape model output unit, and a setup position reading unit configured to read the setup position output from the setup position output unit.

Furthermore, the numerical control apparatus may include a shape model output unit configured to output a tool shape model and material shape model that can be used in the machining simulation apparatus, and a setup position output unit configured to output a tool setup position and a material setup position on a machine tool. The machining simulation apparatus includes a shape model reading unit configured to read the shape model output from the shape model output unit, and a setup position reading unit configured to read the setup position output from the setup position output unit.

Furthermore, the machining simulation apparatus may further include a relating unit configured to relate numerical control information stored in the machining simulation apparatus, the shape model retrieved by the shape model reading unit, and the setup position retrieved by the setup-position reading unit, and store the related data so as to be reused.

Moreover, a machining simulation system includes a machining simulation apparatus and a numerical control apparatus each having a machining simulation function using a tool shape model and a material shape model, which can communicate with each other via a communication unit or a storage medium so as to mutually transmit and receive data.

The machining simulation apparatus includes a unit configured to output preparatory planning information including the tool or material shape model and a setup position on a machine tool which are used in a machining simulation operation or in an interference check operation. The numerical control apparatus includes a unit configured to read and display the preparatory planning information.

According to the present invention, the machining simulation apparatus and the numerical control apparatus can mutually transmit and receive tool/material shape models and tool/material setup positions on a machine tool via a communication unit or a storage medium. Furthermore, the machining simulation apparatus can relate the numerical control information with the tool/material shape models and tool/material setup positions corrected by the numerical control apparatus and can store the related data so as to be reused.

Furthermore, the numerical control apparatus side can display preparatory planning information including a tool or material shape model and a setup position on a machine tool which are used in the machining simulation apparatus.

In this manner, the present invention enables the numerical control apparatus of a worksite to use shape model information and setup positional data set by the machining simulation apparatus of a production engineering division. Thus, an operator of the production engineering division is not required to generate a paper document or other medium that describes or indicates the preparatory planning information.

With the present invention, an operator of the worksite is not required to set all of the data for the numerical control apparatus. Because the setting work for the numerical control apparatus is substantially limited to setting a small amount of correction data reflecting a machining processing environment, the setting work is reduced and simplified, which in turn reduces the number and frequency of setting errors.

Moreover, the correction data reflecting a machining processing environment generated by the numerical control apparatus side can be easily fed back to the machining simulation apparatus side. Thus, the production engineering division can store the feedback data as a database usable for the machining simulation apparatus. As a result, an environment of the machining simulation apparatus can be improved so as to fit to the environment of the worksite. Thus, the present invention can simplify a work for adjusting the environment of the machining simulation apparatus according to the processing environment of the worksite.

BRIEF DESCRIPTION OF THE DRAWINGS

The accompanying drawings, which are incorporated in and constitute a part of the specification, illustrate an embodiment of the invention and, together with the description, serve to explain the principles of the invention, in which.

DESCRIPTION OF PREFERRED EMBODIMENT

Figure 1:
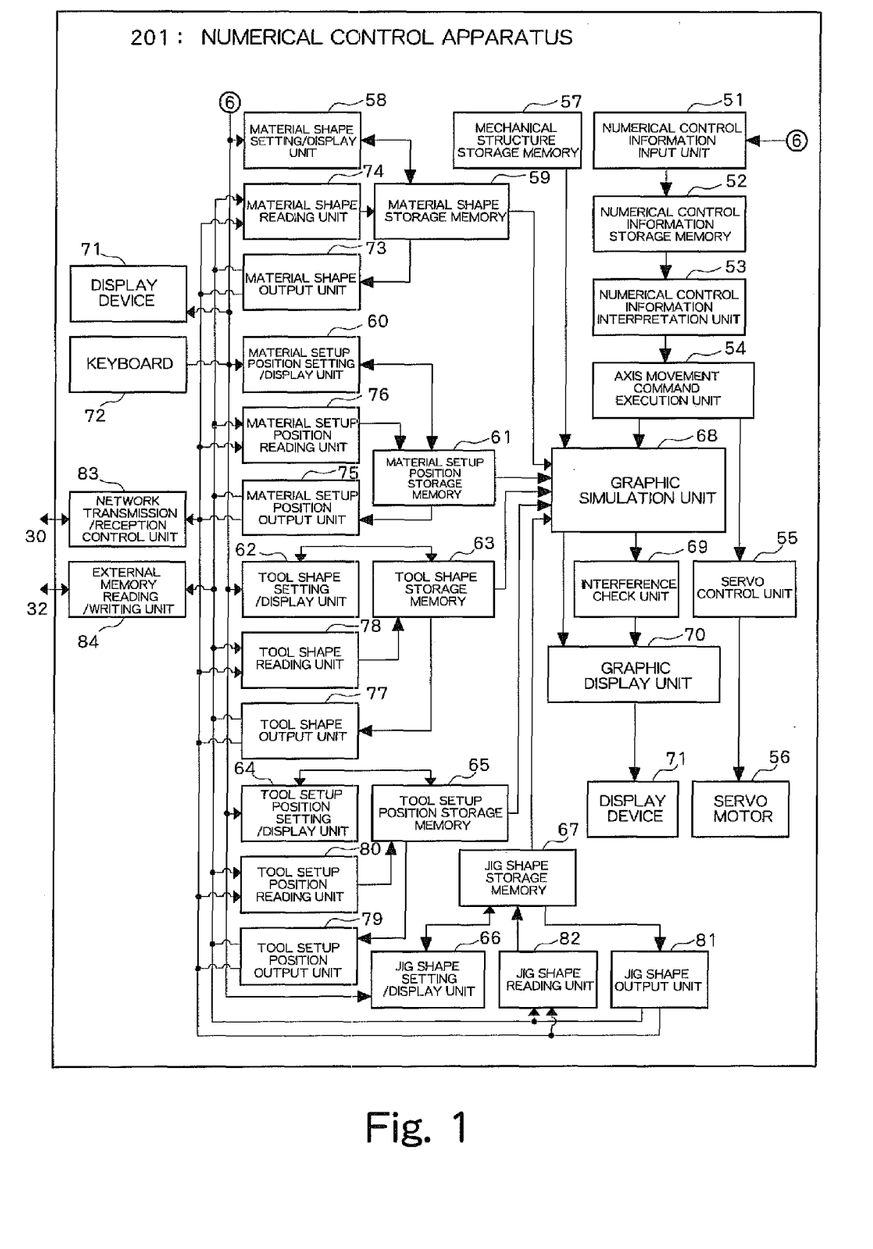
FIG. 1 is a block diagram illustrating a numerical control apparatus of a machining simulation system according to an embodiment of the present invention.
Figure 2:
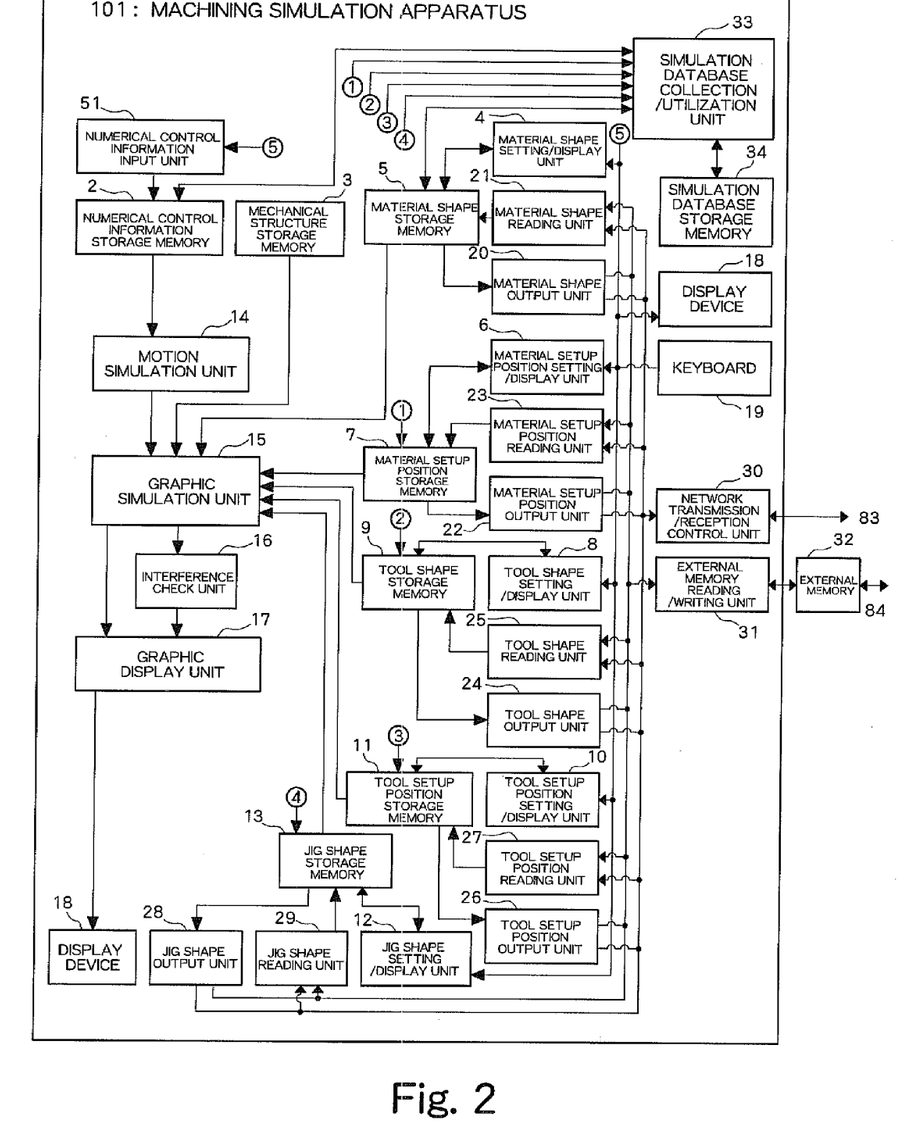
FIG. 2 is a block diagram illustrating a machining simulation apparatus of a machining simulation system according to an embodiment of the present invention.

FIGS. 1 and 2 are block diagrams of an exemplary embodiment of the present invention. In FIGS. 1 and 2, functional components similar to those described in FIGS. 6 and 7 are denoted by the same reference numerals.

In a machining simulation apparatus 101, a material shape output unit 20 generates a material shape model and outputs the generated model to a network transmission/reception control unit 30 that can transmit the received model to a numerical control apparatus 201 via a network. Furthermore, the material shape output unit 20 can output the generated material shape model to an external memory 32 via an external memory reading/writing unit 31.

Similarly, a material setup position output unit 22 generates a material setup position and outputs the generated positional information to the network transmission/reception control unit 30 that can transmit the received information to the numerical control apparatus 201 via the network. Furthermore, the material setup position output unit 22 can output the generated material setup position to the external memory 32 via the external memory reading/writing unit 31.

Similarly, a tool shape output unit 24 generates a tool shape model and outputs the generated model to the network transmission/reception control unit 30 that can transmit the received model to the numerical control apparatus 201 via the network. Furthermore, the tool shape output unit 24 can output the generated tool shape model to the external memory 32 via the external memory reading/writing unit 31.

Similarly, a tool setup position output unit 26 generates a tool setup position and outputs the generated positional information to the network transmission/reception control unit 30 that can transmit the received information to the numerical control apparatus 201 via the network. Furthermore, the tool setup position output unit 26 can output the generated tool setup position to the external memory 32 via the external memory reading/writing unit 31.

Similarly, a jig shape output unit 28 generates a jig shape model and outputs the generated model to the network transmission/reception control unit 30 that can transmit the received model to the numerical control apparatus 201 via the network. Furthermore, the jig shape output unit 28 can output the generated jig shape model to the external memory 32 via the external memory reading/writing unit 31.

In the numerical control apparatus 201, a material shape reading unit 74 reads the material shape model via a network transmission/reception control unit 83 that is connected to the network or via an external memory reading/writing unit 84 that can read the data stored in the external memory 32. The material shape storage memory 59 stores the retrieved material shape model.

Similarly, a material setup position reading unit 76 reads the material setup position via the network transmission/reception control unit 83, or via the external memory reading/writing unit 84 that can read the data stored in the external memory 32. The material setup position storage memory 61 stores the retrieved material setup position.

Similarly, a tool shape reading unit 78 reads the tool shape model via the network transmission/reception control unit 83, or via the external memory reading/writing unit 84 that can read the data stored in the external memory 32. The tool shape storage memory 63 stores the retrieved tool shape model.

Similarly, a tool setup position reading unit 80 reads the tool setup position via the network transmission/reception control unit 83, or via the external memory reading/writing unit 84 that can read the data stored in the external memory 32. The tool setup position storage memory 65 stores the retrieved tool setup position.

Similarly, a jig shape reading unit 82 reads the jig shape model via the network transmission/reception control unit 83, or via the external memory reading/writing unit 84 that can read the data stored in the external memory 32. The jig shape storage memory 67 stores the retrieved jig shape model.

In the numerical control apparatus 201, a material shape output unit 73 generates a material shape model and outputs the generated model to the network transmission/reception control unit 83 that can transmit the received model to the machining simulation apparatus 101 via the network. Furthermore, the material shape output unit 73 can output the generated material shape model to the external memory 32 via the external memory reading/writing unit 84.

Similarly, a material setup position output unit 75 generates a material setup position and outputs the generated positional information to the network transmission/reception control unit 83 that can transmit the received information to the machining simulation apparatus 101 via the network. Furthermore, the material setup position output unit 75 can output the generated material setup position to the external memory 32 via the external memory reading/writing unit 84.

Similarly, a tool shape output unit 77 generates a tool shape model and outputs the generated model to the network transmission/reception control unit 83 that can transmit the received model to the machining simulation apparatus 101 via the network. Furthermore, the tool shape output unit 77 can output the generated tool shape model to the external memory 32 via the external memory reading/writing unit 84.

Similarly, a tool setup position output unit 79 generates a tool setup position and outputs the generated positional information to the network transmission/reception control unit 83 that can transmit the received information to the machining simulation apparatus 101 via the network. Furthermore, the tool setup position output unit 79 can output the generated tool setup position to the external memory 32 via the external memory reading/writing unit 84.

Similarly, a jig shape output unit 81 generates a jig shape model and outputs the generated model to the network transmission/reception control unit 83 that can transmit the received model to the machining simulation apparatus 101 via the network. Furthermore, the jig shape output unit 81 can output the generated jig shape model to the external memory 32 via the external memory reading/writing unit 84.

In the machining simulation apparatus 101, a material shape reading unit 21 reads the material shape model via the network transmission/reception control unit 30, or via the external memory reading/writing unit 31 that can read the data stored in the external memory 32. The material shape storage memory 5 stores the retrieved material shape model.

Similarly, a material setup position reading unit 23 reads the material setup position via the network transmission/reception control unit 30, or via the external memory reading/writing unit 31 that can read the data stored in the external memory 32. The material setup position storage memory 7 stores the retrieved material setup position.

Similarly, a tool shape reading unit 25 reads the tool shape model via the network transmission/reception control unit 30, or via the external memory reading/writing unit 31 that can read the data stored in the external memory 32. The tool shape storage memory 9 stores the retrieved tool shape model.

Similarly, a tool setup position reading unit 27 reads the tool setup position via the network transmission/reception control unit 30, or via the external memory reading/writing unit 31 that can read the data stored in the external memory 32. The tool setup position storage memory 11 stores the retrieved tool setup position.

Similarly, a jig shape reading unit 29 reads the jig shape model via the network transmission/reception control unit 30, or via the external memory reading/writing unit 31 that can read the data stored in the external memory 32. The jig shape storage memory 13 stores the retrieved jig shape model.

With the above-described functional units according to the machining simulation system of the present invention, the machining simulation apparatus and the numerical control apparatus can mutually transmit and receive tool/material shape models and tool/material setup positions on a machine tool via a communication unit or a storage medium.

Furthermore, in the machining simulation apparatus 101, a simulation database collection/utilization unit 33 correlates numerical control information stored in the numerical control information storage memory 2 with machining simulation data or interference check data used in the numerical control apparatus 201 (i.e., material/tool shape models, tool/material setup positions, and jig shape model) stored in the storage memories. The simulation database collection/utilization unit 33 causes a simulation database storage memory 34 to store the related data so that it may be reused.

As an exemplary storage of related and reusable data, the simulation database collection/utilization unit 33 can store a "machining simulation environment set" that includes a name of numerical control information stored in the numerical control information storage memory 2, a name of the material shape model (i.e., a material to be processed according to the numerical control information) stored in the material shape storage memory 5, a name of material setup position stored in the material setup position storage memory 7, a name of the tool shape model (i.e., a tool to be used in the machining processing according to the numerical control information) stored in the tool shape storage memory 9, a name of the tool setup position stored in the tool shape setup position storage memory 11, and a name of the jig shape model (i.e., a jig to be used in the machining processing according to the numerical control information) stored in the jig storage memory 13.

Thus, the machining simulation apparatus 101 can reuse the numerical control information together with the material shape model, the material setup position, the tool shape model, the tool setup position, and the jig shape by referring to the machining simulation environment set.

When an operator of the numerical control apparatus 201 corrects the numerical control information stored in the simulation database storage memory 34, the corrected numerical control information is stored in the numerical control information storage memory 52 of the numerical control apparatus 201. Although not illustrated in FIGS. 1 and 2, the numerical control apparatus 201 can transmit the corrected numerical control information to the numerical control information storage memory 2 of the machining simulation apparatus 101 via the external memory 32 or a network. Thus, the corrected numerical control information can be stored in the simulation database storage memory 34.

Figure 3:
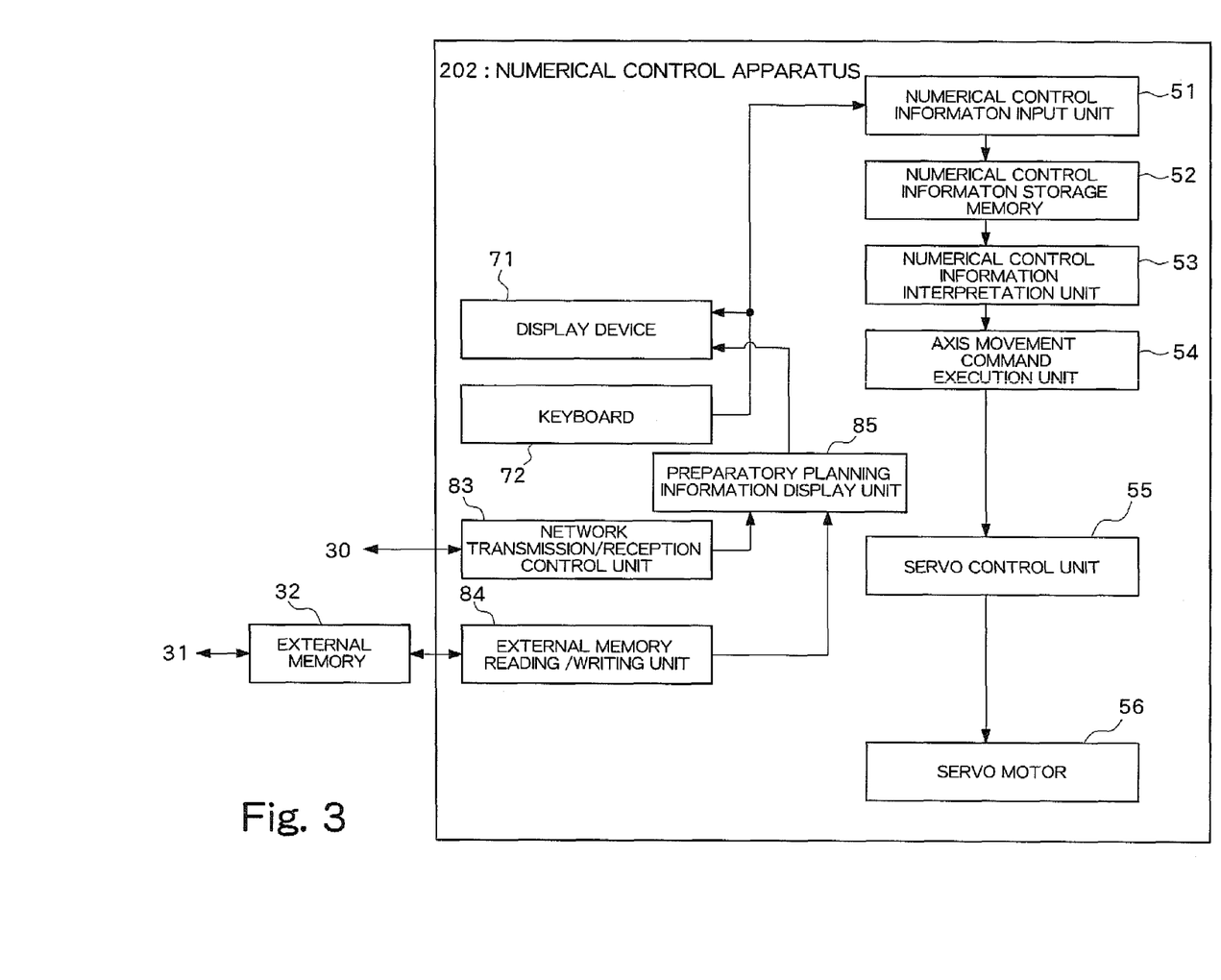
FIG. 3 is a block diagram illustrating a numerical control apparatus of a machining simulation system according to an embodiment of the present invention.
Figure 4:
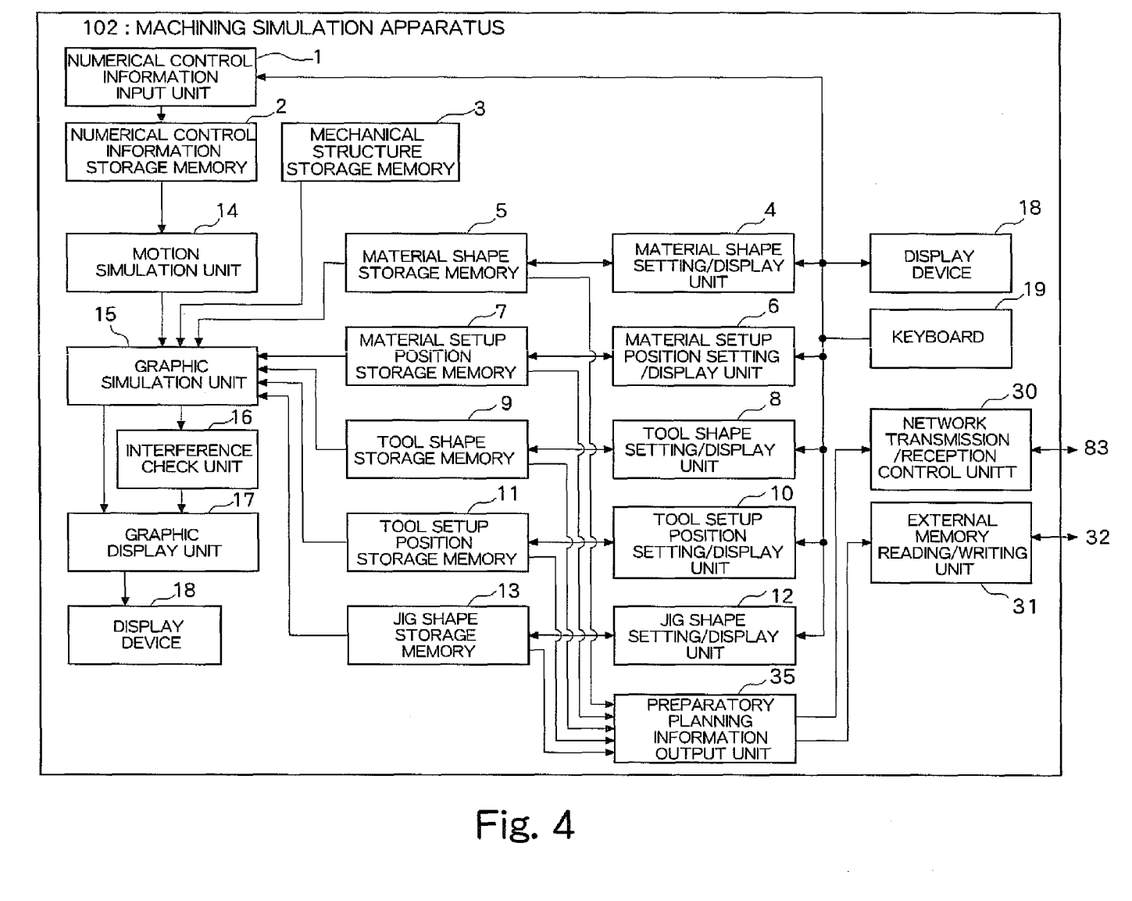
FIG. 4 is a block diagram illustrating a machining simulation apparatus of a machining simulation system according to an embodiment of the present invention.

Next, exemplary processing for outputting and displaying preparatory planning information will be described with reference to FIGS. 3 and 4. A machining simulation apparatus 102 includes a preparatory planning information output unit 35 configured to generate preparatory planning information including a material shape model, a material setup position, a tool shape model, a tool setup position, and a jig shape model which are set for a machining simulation or an interference check.

The preparatory planning information output unit 35 transmits the preparatory planning information to the network transmission/reception control unit 30 that can transmit the preparatory planning information to a numerical control apparatus 202 via a network. Furthermore, the preparatory planning information output unit 35 can output the preparatory planning information to the external memory 32 via the external memory reading/writing unit 31. The numerical control apparatus 202 includes a preparatory planning information display unit 85 that causes the display device 71 to display the received preparatory planning information.

Figure 5:
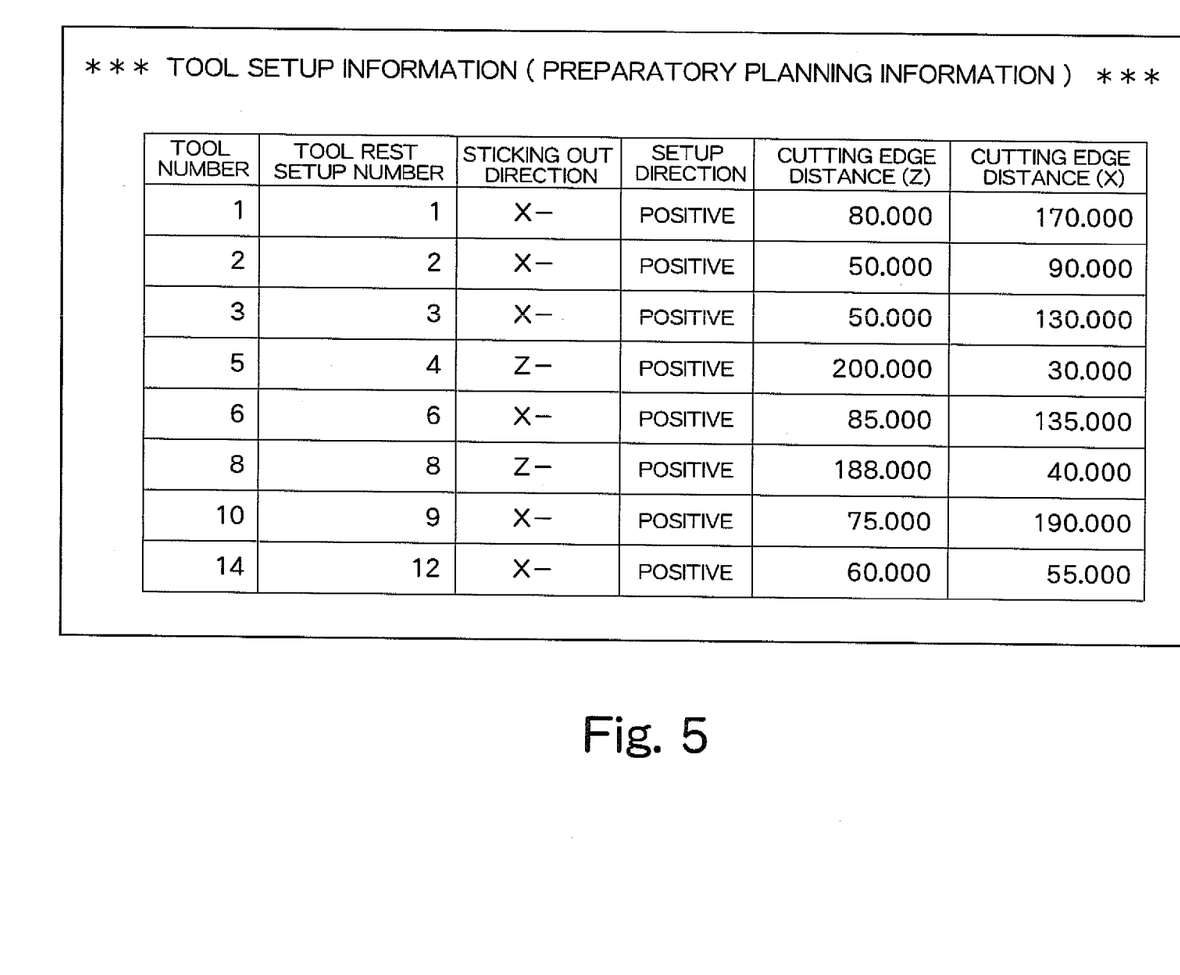
FIG. 5 illustrates an exemplary preparatory planning information display screen.

FIG. 5 illustrates an exemplary display screen that the display device 71 can display according to the processing of the preparatory planning information display unit 85.

With the above-described functional units, the machining simulation system according to the present embodiment enables the numerical control apparatus to use the preparatory planning information (i.e., data relating to a tool, a material, or a jig) set by the machining simulation apparatus.

The machining simulation system according to the present embodiment has the following effects:

*1: The numerical control apparatus can use simulation data (e.g., material shape model, material setup position, tool shape model, and tool setup position) set by the machining simulation apparatus. Therefore, a setting work for the numerical control apparatus is substantially limited to correction data reflecting a machining processing environment.

*2: As the setting process is simplified, the likelihood and number of setting errors can be reduced.

*3: An operator of the production engineering division is not required to generate a paper document or other medium that describes or indicates preparatory planning information set by the machining simulation apparatus side, to send the setting data to an operator of the numerical control apparatus side.

*4: The data corrected by the numerical control apparatus side according to a machining processing environment can be easily fed back to the machining simulation apparatus side. Because a paper document or other medium is not used, a feedback operation can be reliably performed.

*5: The machining simulation apparatus side can easily collect machining data actually used in a machining operation and can establish a reusable database including the collected data. As a result, the environment of the machining simulation apparatus can be improved so as to fit within the environment of the worksite.

What is claimed is:

1. A machining simulation system comprising:
a numerical control apparatus capable of performing a machining simulation with a tool shape model and a material shape model; and
a machining simulation apparatus capable of performing a machining simulation with the tool shape model and the material shape model and communicating with the numerical control apparatus via a communication unit or a storage medium so as to mutually transmit and receive data,
wherein the machining simulation apparatus comprises:
a shape model output unit configured to output a tool shape model and a material shape model that can be used in the numerical control apparatus, and
a setup position output unit configured to output a tool setup position and a material setup position on a machine tool,
wherein the numerical control apparatus comprises:
a shape model reading unit configured to read the shape model output from the shape model output unit, and
a setup position reading unit configured to read the setup position output from the setup position output unit.

2. The machining simulation system according to claim 1, wherein the numerical control apparatus comprises:
a shape model output unit configured to output a tool shape model and a material shape model that can be used in the machining simulation apparatus, and
a setup position output unit configured to output a tool setup position and a material setup position on a machine tool,
wherein the machining simulation apparatus comprises:
a shape model reading unit configured to read the shape model output from the shape model output unit, and
a setup position reading unit configured to read the setup position output from the setup position output unit.

3. The machining simulation system according to claim 2, wherein the machining simulation apparatus further comprises a correlating unit configured to correlate numerical control information stored in the machining simulation apparatus, the shape model read by the shape model reading unit, and the setup position read by the setup position reading unit, and to store the correlated data in such a manner that it can be reused.

4. A machining simulation system including a machining simulation apparatus and a numerical control apparatus, each having a machining simulation function using a tool shape model and a material shape model and which can communicate with each other via a communication unit or a storage medium so as to mutually transmit and receive data,
wherein the machining simulation apparatus comprises a unit configured to output preparatory planning information including a tool or material shape model and a setup position on a machine tool which are used in a machining simulation operation or in an interference check operation, and
wherein the numerical control apparatus comprises a unit configured to read and display the preparatory planning information.

* * * * *